United States Patent
Nozoe et al.

(10) Patent No.: US 8,652,369 B2
(45) Date of Patent: Feb. 18, 2014

(54) PROCESS FOR PRODUCING MOLDED SILICONE RUBBER SPONGE

(75) Inventors: Tsugio Nozoe, Chiba (JP); Atsushi Sakuma, Ichihara (JP); Hiroaki Yoshida, Ichihara (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 269 days.

(21) Appl. No.: 12/993,635

(22) PCT Filed: May 15, 2009

(86) PCT No.: PCT/JP2009/059051
§ 371 (c)(1),
(2), (4) Date: Nov. 19, 2010

(87) PCT Pub. No.: WO2009/142151
PCT Pub. Date: Nov. 26, 2009

(65) Prior Publication Data
US 2011/0074061 A1 Mar. 31, 2011

(30) Foreign Application Priority Data
May 23, 2008 (JP) ................... 2008-135995

(51) Int. Cl.
*B29C 44/56* (2006.01)
(52) U.S. Cl.
USPC ........................................................ 264/51
(58) Field of Classification Search
USPC ........................................................ 264/51
See application file for complete search history.

(56) References Cited

FOREIGN PATENT DOCUMENTS

| JP | 63-003414 U | 1/1988 |
|---|---|---|
| JP | 06-055553 A | 3/1994 |
| JP | 10-034675 A | 2/1998 |
| JP | 2000-210943 A | 8/2000 |
| JP | 2003-176412 A | 6/2003 |
| JP | 2005-503282 A | 2/2005 |
| JP | 2005-062534 A | 3/2005 |
| JP | 2007-085451 A | 4/2007 |
| WO | WO 03-026870 A1 | 4/2003 |

OTHER PUBLICATIONS

Japanese Patent No. JP 63-003414, English abstract and translation not available, 15 pages.
English language translation and abstract for JP 06-055553 extracted from PAJ database Feb. 11, 2011, 25 pages.
English language translation and abstract for JP 10-034675 extracted from PAJ database Feb. 11, 2011, 47 pages.
English language translation and abstract for JP 2000-210943 extracted from PAJ database Feb. 11, 2011, 35 pages.
English language translation and abstract for JP 2003-176412 extracted from PAJ database Feb. 11, 2011, 40 pages.

(Continued)

*Primary Examiner* — Yogendra Gupta
*Assistant Examiner* — Robert J Grun
(74) *Attorney, Agent, or Firm* — Howard & Howard Attorneys PLLC

(57) ABSTRACT

The present invention relates to a process for producing a molded silicone rubber sponge by filling a sponge-forming silicone rubber composition into a cavity of a mold, wherein after the aforementioned sponge-forming silicone rubber composition is cured, and before mold opening of the aforementioned mold, gas present in the aforementioned cavity is discharged. Thereby, a molded silicone rubber sponge without damage such as chips or the like can be effectively produced.

15 Claims, 2 Drawing Sheets

(56) References Cited

OTHER PUBLICATIONS

English language translation and abstract for JP 2005-062534 extracted from PAJ database Feb. 11, 2011, 40 pages.
English language abstract for JP2005-503282 extracted from PAJ database Feb. 8, 2011, 38 pages.
English language translation and abstract for JP 2007-085451 extracted from PAJ database Feb. 11, 2011, 47 pages.
PCT International Search Report for PCT/JP2009/059051, dated Jun. 16, 2009, 4 pages.

PROCESS FOR PRODUCING MOLDED SILICONE RUBBER SPONGE

TECHNOLOGICAL FIELD

The present application claims priority to and all the advantages of International Patent Application No. PCT/JP2009/059051, filed on May 15, 2009, which claims priority to Japanese Patent Application No. 2008-135995 filed in Japan on May 23, 2008, the entire contents of which are hereby incorporated by reference.

The present invention relates to a process for producing a molded product formed from a sponge made of a silicone rubber (hereinafter, referred to as "silicone rubber sponge").

BACKGROUND ART

Silicone rubber sponges possess superior thermal resistance, superior weather resistance, light weight, and a low thermal conductivity. For these reasons, the silicone rubber sponges are used in various sealing elements such as packing, gaskets, o rings, and the like; rollers and belts of image-forming apparatuses such as copying machines, printers and the like; automotive parts such as hood buffering pads, engine vibration insulators and the like; and other applications.

Compositions for obtaining silicone rubber sponges are known. For example, Japanese Unexamined Patent Application, First Publication No. 2005-62534 describes a sponge-forming silicone rubber composition of an addition-reaction curing type which contains water and a surfactant, and a silicone rubber sponge obtained from the aforementioned composition is used as a constructional material of a fixing roller of an image-forming apparatus.

DISCLOSURE OF THE INVENTION

Problems to be Solved by the Invention

The aforementioned sponge-forming silicone rubber composition is in the form of an emulsion in which an aqueous phase and a silicone phase are uniformly dispersed by means of a surfactant, and forms a molded silicone rubber sponge in a hydrous form by heating the composition in a mold with a specifically-formed cavity to cure (crosslink). The molded silicone rubber sponge is removed from the mold after mold opening, and subsequently water is removed therefrom by heating or the like. Thereby, a silicone rubber sponge is produced.

It can be seen that depending on types of the sponge-forming silicone rubber compositions, at the time of removing the molded silicone rubber sponge from the mold, and even after the molded sponge is cooled and the thermal expansion thereof is reduced, a part of the aforementioned molded product extrudes from the cavity due to the gas generated during heating in the cavity, cracking may occur in the molded product in the cavity, the molded product may be broken, or the aforementioned extruded part may be lost due to stress concentration. In general, a molded silicone rubber sponge has reduced strength compared with a molded urethane sponge, and for this reason, the molded silicone rubber sponge is easily broken. In particular, the possibility of the breakage is remarkable in molding of a roller with a cylindrical cavity.

Therefore, a method in which before the aforementioned molded silicone rubber sponge is removed from the mold, the mold is allowed to stand for a long time even after cooling, and the pressure in the cavity is reduced, may be considered. However, the molded silicone rubber sponge must be allowed to stand for 5 hours or more until the molded product is removed from the mold after cooling in some cases. Therefore, the molding period is increased, and it is difficult to effectively produce a molded silicone rubber sponge.

In view of the problems described above, the present invention has an object to effectively produce a molded silicone rubber sponge without damage such as cracks, breakages, chips or the like.

Means for Solving the Problems

The object of the present invention can be achieved by discharging gas in a cavity of a mold after curing a sponge-forming silicone rubber composition and before mold opening, when a molded silicone rubber sponge is produced by filling a sponge-forming silicone rubber composition into the cavity of the mold. The aforementioned molded silicone rubber sponge is preferably produced by means of cast molding.

The aforementioned sponge-forming silicone rubber composition is cured preferably by means of heating, and the cavity during heating is preferably encapsulated. In addition, after the aforementioned gas is discharged and before mold opening, a cured product of the aforementioned sponge-forming silicone rubber composition is preferably cooled.

In the process for producing a molded silicone rubber sponge of the present invention, a dehydrating step of removing water from the aforementioned molded silicone rubber sponge is preferably included, after the aforementioned mold opening step.

At least one part of the aforementioned cavity preferably has a hole for discharging gas. In addition, the aforementioned hole is preferably openable and closable. Furthermore, a means for controlling deformation during discharging the aforementioned gas of a cured product of the aforementioned sponge-forming silicone rubber composition is preferably provided in the aforementioned mold.

The aforementioned sponge-forming silicone rubber composition preferably comprises:
(A) a polyorganosiloxane having at least two silicon-bonded alkenyl groups in one molecule;
(B) a polyorganosiloxane having at least two silicon-bonded hydrogen atoms in one molecule;
(C) water;
(D) a thickener;
(E) an emulsifier; and
(F) a hydrosilylation reaction catalyst.

In addition, the aforementioned sponge-forming silicone rubber composition more preferably further comprises a curing retarder.

The aforementioned molded silicone rubber sponge is preferably a roller, a belt, or a constitutional member thereof.

Effects of the Invention

In the process for producing a molded silicone rubber sponge of the present invention, when a molded silicone rubber sponge is produced by filling a sponge-forming silicone rubber composition into a cavity of a mold, gas present in the cavity is discharged before mold opening of the aforementioned mold. For this reason, no damage such as cracks, breakages or chips caused by extruding a part of the molded silicone rubber sponge from the cavity occur at the time of mold opening.

In addition, in the process of producing a molded silicone rubber sponge of the present invention, a molded silicone rubber sponge can be removed from a mold by means of mold opening without standing the mold for a long time. For this reason, a molded silicone sponge can be effectively produced.

When gas is discharged outside from the cavity during heating the sponge-forming silicone rubber composition in the mold, an unfoamed thin rubber layer may be formed on the surface of the molded silicone rubber sponge. In the usage in which it is not preferred that the cells in the sponge be separated from the external world due to the aforementioned unfoamed thin rubber layer, an extra step of removing the aforementioned rubber layer by means of grinding or the like must be carried out. In addition, large-sized cells may be formed around the gas-discharging part, and uniformity of cell size in the molded silicone rubber sponge may be impaired.

However, in the case of maintaining an airtight condition of the cavity during the heat-curing step, no unfoamed thin rubber layer is formed on the surface of the molded silicone rubber sponge obtained in accordance with the present invention. For this reason, it is unnecessary to remove the aforementioned unfoamed rubber layer by means of grinding or the like. The aforementioned airtight condition used herein means a condition in which a sponge-forming silicone rubber composition and a cured product thereof in the cavity do not leak outside of the cavity, and includes both a perfect airtight condition and a low airtight condition in which only the gas in the cavity is slightly released outside. Thereby, a molded silicone rubber sponge can be further effectively produced. In addition, the cell size in the molded silicone rubber sponge can be uniform, and performance of the molded sponge can be improved.

The molded silicone rubber sponges obtained by the present invention can be used in the production of various sponge products. As the aforementioned sponge products, for example, cosmetic puffs, medical liquid-absorbing materials, various filters and the like may be mentioned. They may be sponge products per se, or may be composites or laminates with metals, organic resins, or elastic materials. In particular, the present invention is preferably used in the production of molded products in the form of a roller or belt. In particular, the present invention can be preferably used in the production of fixing rollers, fixing belts and the like which fix toners on paper by means of heat and/or pressure in image-forming apparatuses of electrophotographic types such as copying machines, printers, facsimile machines, and the like.

BRIEF DESCRIPTION OF DRAWINGS

[FIG. 3] A general cross-sectional view of a mold used in the examples.

MODES FOR CARRYING OUT THE INVENTION

Figure 1:
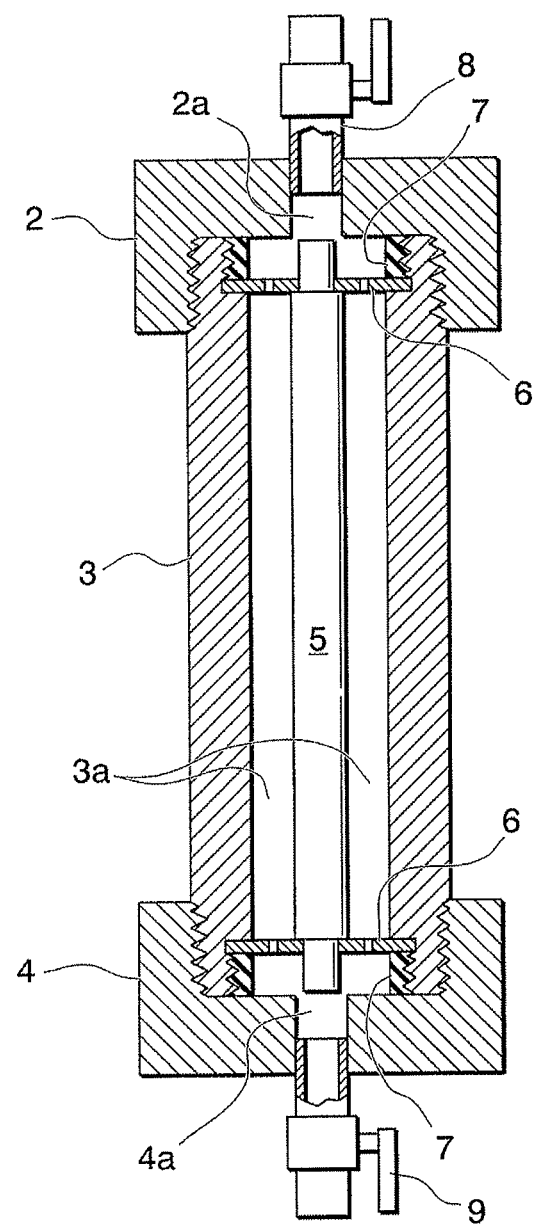
[FIG. 1] A cross-sectional view showing an embodiment of a mold for roller molding usable in carrying out the present invention.

In the present invention, a sponge-forming silicone rubber composition is filled into a cavity in a mold, and thereby, a molded silicone rubber sponge is produced. The shape of the cavity is not limited, and molded products with various shapes can be produced. The present invention is, in particular, suitably used in the case of producing a molded product such as a roller, a rod, a tube, a belt or the like by means of cast molding using a mold having a cavity in the form of a cylinder or a tube. The cast molding is a molding method in which a fluid molding material to be molded is filled into a cavity of a mold, and then cured by heating or by means of a curing agent or the like, as generally known.

As the sponge-forming silicone rubber composition used in the present invention, any silicone rubber compositions can be used as long as they have a property of forming a sponge rubber (curability) by means of curing (crosslinking). As the sponge-forming silicone rubber composition, for example, the following compositions can be used:

(1) a silicone rubber composition comprising a thermal decomposable foaming agent such as azobisisobutyronitrile, dicumyl peroxide or the like;

(2) a silicone rubber composition comprising a polyorganosiloxane, an emulsifier, water and a thickener, and forming a silicone rubber sponge by removing water in the molded product after curing by means of heating or the like;

(3) a silicone rubber composition forming a silicone rubber sponge by means of a hydrogen gas generated in a reaction between a polyorganohydrogensiloxane and an alcohol and/or water, by coexistence of water and/or an alcohol when a rubber elastic body is obtained by crosslinking by means of a reaction mechanism in which an alkenyl group-containing polyorganosiloxane and the polyorganohydrogensiloxane are hydrosilylated in the presence of a platinum catalyst; and the like.

In the present invention, a silicone rubber composition comprising a polyorganosiloxane, an emulsifier, water and a thickener, and forms a silicone rubber sponge by removing water in a molded product after curing, is preferably used. Such a silicone rubber composition is preferably crosslinked by a reaction mechanism in which an alkenyl group-containing polyorganosiloxane and a polyorganohydrogensiloxane are hydrosilylated in the presence of a platinum catalyst.

A sponge-forming silicone rubber composition which is preferred in the present invention comprises:

(A) a polyorganosiloxane having at least two silicon-bonded alkenyl groups in a molecule;
(B) a polyorganosiloxane having at least two silicon-bonded hydrogen atoms in a molecule;
(C) water;
(D) a thickener;
(E) an emulsifier; and
(F) a hydrosilylation reaction catalyst.

The aforementioned polyorganosiloxane having at least two silicon-bonded alkenyl groups in a molecule (A) is one of the main components of the sponge-forming silicone rubber composition, and has at least two silicon-directly-bonded alkenyl groups in a molecule. As examples of the alkenyl groups, mention may be made of, for example, a vinyl group, an allyl group, a propenyl group, an isopropenyl group, a butenyl group, an isobutenyl group, a pentenyl group, a hexenyl group, a heptenyl group and the like. A vinyl group is preferred.

The aforementioned component (A) may have a hydroxyl group or an organic group other than an alkenyl group. As examples of organic groups other than alkenyl groups, mention may be made of, for example, substituted or non-substituted monovalent hydrocarbon groups generally having 1 to 10 carbon atoms and preferably having 1 to 8 carbon atoms, such as alkyl groups such as a methyl group, an ethyl group, a propyl group, a butyl group, a pentyl group, a hexyl group and the like; cycloalkyl groups such as a cyclopentyl group, a cyclohexyl group and the like; aryl groups such as a phenyl group, a tolyl group, a xylyl group, a naphthyl group and the like; aralkyl groups such as a benzyl group, a phenethyl group and the like; halogen-substituted alkyl groups such as a 3,3,3-trifluoropropyl group, a 3-chloropropyl group and the like; and the like. A methyl group is preferred.

The viscosity of the aforementioned polyorganosiloxane having at least two silicon-bonded alkenyl groups in a molecule (A) at 25° C. preferably ranges from 0.1 to 100 Pa·s and more preferably ranges from 0.1 to 40 Pa·s. The polyorganosiloxane of the aforementioned component (A) may be linear or branched or may comprise a combination of both structures thereof. As the aforementioned polyorganosiloxane (A), a substantially linear polydiorganosiloxane having no alkenyl groups on side chains, the main chain of which is composed of repeating diorganosiloxane units and both molecular terminals of which are capped with alkenyldiorganosiloxy groups; a substantially linear polydiorganosiloxane having two or more alkenyl groups on side chains, the main chain of which is composed of repeating diorganosiloxane units and both molecular terminals of which are capped with alkenyldiorganosiloxy groups or triorganosiloxy groups containing no alkenyl groups; and a mixture thereof are preferred.

The silicon-bonded alkenyl groups in the aforementioned component (A) may be the same or different. The polydiorganosiloxane of the aforementioned component (A) may have a small amount of hydroxyl groups or organic groups at the molecular terminals.

The aforementioned polyorganosiloxane having at least two silicon-bonded hydrogen atoms in a molecule (B) is a crosslinker of the sponge-forming silicone rubber composition, and has at least two silicon-directly-bonded hydrogen atoms in a molecule. The silicon-bonded hydrogen atoms may be positioned at the terminal siloxane units and/or at the siloxane units in the polymer chains. The aforementioned polyorganosiloxane is preferably a linear siloxane polymer which comprises essential units of formula $RHSiO_{2/2}$ and/or essential units of formula $R_2XSi_{1/2}$, wherein R represents the same substituted or non-substituted monovalent hydrocarbon group having 1 to 10 carbon atoms and preferably having 1 to 8 carbon atoms as the aforementioned organic groups other than alkenyl groups contained in the aforementioned component (A), and is preferably a methyl group; and X represents a hydrogen atom or R, and which optionally comprises units of formula $R_2SiO_{2/2}$.

The total amount of the silicon-bonded hydrogen atoms (i.e., SiH groups) contained in the aforementioned component (B) preferably ranges from 0.4 to 20, moles and more preferably ranges from 0.4 to 5.0 moles per one mole of alkenyl group of the aforementioned component (A). Therefore, in order to maintain the aforementioned relationship, the relative amount of the aforementioned component (B) per 100 parts by weight of the aforementioned component (A) should be optimally selected, for example, in the range of 0.1 to 1,000 parts by weight, and preferably in the range of 1 to 100 parts by weight. In view of amelioration in permanent compression set of a silicone rubber sponge formed from the silicone rubber composition of the present invention, the total amount of the aforementioned hydrogen atoms preferably ranges from 1.5 to 20, and preferably 1.8 to 5 per one alkenyl group of the aforementioned component (A).

Water of the aforementioned component (C) is a component which is removed after curing (crosslinking) from the sponge-forming silicone rubber composition of the present invention, and thereby, imparts porosity to the obtained silicone rubber, i.e., a sponge state. The type of water used as component (C) is not restricted as long as it is pure. As examples thereof, mention may be made of, for example, tap water, well water, ion-exchanged water, distilled water and the like. In order to provide more stable dispersion of component (C) in component (A), the aforementioned component (C) is preferably ion-exchanged water.

The aforementioned thickener of component (D) is a natural or synthetic, and inorganic or organic thickener and is blended in order to enhance viscosity of the aforementioned water (C) after mixing component (D) with water (C), easily disperse component (C) in component (A), and stabilize the dispersion state of component (C) in component (A). As examples of inorganic thickeners, mention may be made of, for example, natural or synthetic smectite clays such as bentonite and the like including, as main components, clays such as montmorillonite, hectorite, saponite, sauconite, beidellite, and nontronite; and hydrophilic hybrids with the aforementioned clays and anionic polymers such as a polyacrylic acid and the like. As examples of organic thickeners, mention may be made of, for example, water-soluble polymers such as alginic acid, sodium alginate, polyacrylic acid, sodium polyacrylate, polyvinyl alcohol, polyvinylpyrrolidone, polyvinyl methyl ether, carboxyvinyl polymer, modified starch, methylcellulose, ethylcellulose, hydroxyethylcellulose, hydroxypropylcellulose, carboxymethylcellulose, and the like. The blending amount of the aforementioned component (D) preferably ranges from 0.1 to 10 parts by weight, and more preferably ranges from 0.5 to 5 parts by weight with respect to 100 parts by weight of water (C). The aforementioned thickeners may be used alone or in combination with two or more types thereof.

As the aforementioned thickener (D), an inorganic thickener is preferred. In particular, smectite clays such as bentonites (montmorillonites), hectorite clays, saponite clays and the like are preferred, since they can increase viscosity at the time of dispersing in water, and can reduce the amount of an emulsifier, which is described later. As the aforementioned smectite clays, for example, Smecton (trademark, manufactured by Kunimine Co., Ltd.) and Lucentite (trade mark, manufactured by Corp Chemical Co., Ltd.) which are products of hydrothermal synthesis, and Kunipia (trade mark, manufactured by Kunimine Co., Ltd.), Ben-Gel (trade name, manufactured by Hojun Co., Ltd.), Bentone (trade mark, manufactured by Elementis Sprcialties Inc.), and Veegum (trade mark, manufactured by Vanderbilt Co., Inc.) which are natural purified products, and the like are commercially available. The pH of the aforementioned smectite clays preferably ranges from 5.0 to 9.0 since thermal resistance of the silicone rubber sponge can be maintained.

The total amount of the aforementioned component (C) and component (D) preferably ranges from 10 to 250 parts by weight, more preferably ranges from 20 to 200 parts by weight, and further preferably ranges from 40 to 150 parts by weight with respect to 100 parts by weight of the aforementioned component (A). If the total amount of component (C) and component (D) is less than 10 parts by weight, it may be difficult for the silicone rubber composition to be porous, and namely be in the form of a sponge. On the other hand, if the total amount exceeds 250 parts by weight, the strength of the silicone rubber sponge may be impaired. The aforementioned component (D) is preliminarily mixed with component (C) and the mixture is preferably blended into the silicone rubber composition.

As the emulsifier of component (E), conventional emulsifiers can be used, and an anionic, cationic, amphoteric or nonionic type can be used. In particular, as examples thereof, mention may be made of, for example, nonionic surfactants such as glycerol fatty acid esters, polyglycerol fatty acid esters, sorbitol fatty acid esters, sucrose fatty acid esters, polyethylene glycol fatty acid esters, polypropylene glycol fatty acid esters, polyoxyethylene glycerol fatty acid esters, polyoxyethylene sorbitol fatty acid esters, block copolymers of polyoxyethylene and polyoxypropylene, polyoxyethylene alkyl ethers, polyoxyethylene alkyl phenyl ethers, polyoxyethylene fatty acid amides and the like; nonionic surfactants formed from polyorganosiloxanes such as graft copolymers of polysiloxane and polyoxyethylene; cationic surfactants such as aliphatic amine salts, quaternary ammonium salts, alkyl pyridium salts and the like; anionic surfactants such as higher fatty acid salts, higher alcohol sulfate salts, alkyl benzene sulfonic acid salts, alkylnaphthalene sulfonic acid salts, polyethylene glycol sulfate salts and the like; and amphoteric surfactants of carboxybetaine type or glycine type. Among these, nonionic surfactants are preferred since they impart little affect on the hydrosilylation reaction using component (F) described below as a catalyst.

The aforementioned emulsifiers may be used alone or in combination with two or more types thereof. The HLB value of the emulsifier (a weight average HLB value in the case of using two or more types of emulsifiers) is preferably 1 or more, but 10 or less, more preferably 1.5 or more, but less than 6, and in particular, preferably 3.5 or more, but less than 6. The blending amount of the emulsifier (E) preferably ranges from 0.1 to 15 parts by weight and more preferably ranges from 0.2 to 3 parts by weight with respect to 100 parts by weight of component (A).

The aforementioned hydrosilylation reaction catalyst (F) is used in order to accelerate crosslinking of the silicone rubber composition by means of an addition reaction. As the catalyst (F), at least one catalyst selected from a platinum-based catalyst, a palladium-based catalyst, and a rhodium-based catalyst is preferably used. More specifically, as examples thereof, mention may be made of, for example, platinum-based catalysts such as chloroplatinic acid, alcohol-modified chloroplatinic acid, coordination compounds of chloroplatinic acid and olefins, vinylsiloxanes or acetylene compounds, and powdery platinum-based catalysts obtained by dispersing the above in a thermoplastic resin; tetrakis (triphenylphosphine) palladium; chlorotris (triphenylphosphine)rhodium and the like. In particular, a platinum-based catalyst is preferred. The aforementioned component (F) may be present in an effective amount as a catalyst (so-called catalytic amount). More specifically, the catalytic amount (as an amount of the metal element) preferably ranges from 0.01 to 500 ppm and more preferably ranges from 0.1 to 100 ppm, in terms of weight units, with respect to the total amount of the aforementioned component (A) and component (B).

The sponge-forming silicone rubber composition used in the present invention preferably contains a curing retarder. The curing retarder is a component for adjusting the speed of curing of the sponge-forming silicone rubber composition and adjusting the operational period therefor. More specifically, as examples thereof, mention may be made of alcohol derivatives having a carbon-carbon triple bond such as 3-methyl-1-butyn-3-ol, 3,5-dimethyl-1-hexyn-3-ol, phenylbutynol, 1-ethynyl-1-cyclohexanol, and the like; enyne compounds such as 3-methyl-3-penten-1-yne, 3,5-dimethyl-3-hexen-1-yne, and the like; alkenyl group-containing low-molecular weight siloxanes such as tetramethyltetravinylcyclotetrasiloxane, tetramethyltetrahexenylcyclotetrasiloxane and the like; and
  alkyne-containing silanes such as methyl-tris(3-methyl-1-butyn-3-oxy)silane,
vinyl-tris(3-methyl-1-butyn-3-oxy)silane and the like. The aforementioned curing retarders may be used alone or in combination with two or more types thereof.

The blending amount of the curing retarder is appropriately selected in accordance with the type of the sponge-forming silicone rubber composition. The common blending amount thereof ranges from 0.001 parts by weight to 5 parts by weight with respect to 100 parts by weight of component (A).

In view of improvement in strength of a silicone rubber sponge formed from the sponge-forming silicone rubber composition, fine powder of silica for reinforcement is preferably blended in the aforementioned composition. The type of the fine powder of silica for reinforcement is not particularly limited. Fumed silica or precipitated silica are suitable. In addition, the aforementioned fine powder of silica may be subjected to a surface treatment with, for example, a linear polyorganosiloxane, cyclic polyorganosiloxane, hexamethyldisilazane, or various organosilanes. The specific surface area of the aforementioned fine powder of silica for reinforcement preferably ranges from 50 to 350 $m^2/g$ and more preferably ranges from 80 to 250 $m^2/g$. The specific surface area can be determined by means of the BET-absorption method. The aforementioned fine powder of silica for reinforcement may be used alone or in combination with two or more types thereof.

The blending amount of the fine powder of silica for reinforcement is preferably at most 20 parts by weight (namely, ranges from 0 to 20 parts by weight), more preferably ranges from 0 to 15 parts by weight, and further preferably ranges from 0 to 10 parts by weight with respect to 100 parts by weight of the aforementioned component (A).

In the compositions, various additives which are conventionally known as additives for silicone rubbers may be blended, such as reinforcement fillers such as fumed titanium oxide and the like; non-reinforcement fillers such as crushed quartz, crystalline silica, diatomaceous earth, asbestos, aluminosilicic acid, iron oxide, zinc oxide, calcium carbonate and the like; the aforementioned fillers which are subjected to a surface treatment with an organosilicon compound such as organosilane, organopolysiloxane or the like; and carbon blacks such as acetylene black, furnace black, channel black, and the like. In addition, additives which are known as additives for silicone rubber compositions may be blended, such as pigments, thermal resistant agents, flame retardants, mold release agents, plasticizers, acid receptors, non-functional silicone oils and the like, if necessary. In addition, the silicone rubber composition used in the present invention may contain water, and for this reason, preservatives or anti-corrosion agents may be blended.

The sponge-forming silicone rubber composition can be easily produced by uniformly mixing a composition in which the aforementioned components (A) to (F), and the aforementioned various additives, if necessary, are blended, by means of a conventional mixing means. As examples of mixers used herein, mention may be made of a homo mixer, a paddle mixer, a homo disperser, a colloidal mill, or a vacuum agitator and the like. The mixer is not particularly limited as long as components (C), (D) and (E) can be sufficiently dispersed in component (A).

The sponge-forming silicone rubber compositions can be produced by, for example, the following methods. In the case of blending fine powder of silica for reinforcement, preferably, first, a silica master batch is prepared by blending a part of component (A) and the fine powder of silica for reinforcement, and subsequently, the remaining part of component (A) and other components are mixed therein.

More specifically, as examples of the aforementioned methods, mention may be made of:
(1) a method in which component (A), component (B), component (C), component (D), component (E) and, if necessary, a curing retarder and/or fine powder of silica for reinforcement are placed in a mixer and stirred and mixed for a predetermined period, and immediately before use, component (F) is blended therein by means of a mixing device such as a static mixer, a dynamic mixer such as a pin mixer, or the like;

(2) a method in which component (A), component (C), component (D), component (E), component (F), and, if necessary, fine powder of silica for reinforcement are placed in a mixer and stirred and mixed for a predetermined period, and immediately before use, component (B) and, if necessary, a curing retarder are blended therein by means of a mixing device such as a static mixer, a dynamic mixer such as a pin mixer, or the like; or (3) a method in which component (A), component (C), component (D), component (E) and, if necessary, a curing retarder and/or fine powder of silica for reinforcement are placed in a mixer and stirred and mixed for a predetermined period, and immediately before use, component (B) and component (F) are blended therein by means of a mixing device such as a static mixer, a dynamic mixer such as a pin mixer, or the like.

From the viewpoint of storage stability, preferably, the sponge-forming silicone rubber composition is stored as the following triple-component type of the sponge-forming silicone rubber liquid composition, and immediately before molding, the following compositions (I) to (III) are mixed by means of a mixing device such as a static mixer, a dynamic mixer such as a pin mixer or the like.

(I): a composition which comprises component (A), component (C), component (D), component (E), component (F), and, if necessary, fine powder of silica for reinforcement, and does not contain component (B) or a curing retarder, (II): a composition which comprises component (A), component (C), component (D), component (E), and, if necessary, a curing retarder and/or fine powder of silica for reinforcement, and does not contain component (B) or component (F), and (III): a composition which comprises component (B) and does not contain component (C), component (D), component (E), or component (F);

(I): a composition which comprises component (A), component (C), component (D), component (E), component (F), and, if necessary, fine powder of silica for reinforcement, and does not contain component (B) or a curing retarder, (II): a composition which comprises a curing retarder and does not contain component (B), component (C), component (D), or component (F), and (III): a composition which comprises component (B) and does not contain component (C), component (D), or component (F); or (I): a composition which comprises component (A), component (C), component (D), component (E), and, if necessary, a curing retarder and/or fine powder of silica for reinforcement, and does not contain component (B) or component (F), (II): a composition which comprises component (F) and does not contain component (B), component (C), component (D), or component (E), and (III): a composition which comprises component (B) and does not contain component (C), component (D), component (E), or component (F).

In addition, the sponge-forming silicone rubber composition is preferably stored as the following double-component type of the sponge-forming silicone rubber liquid composition, and immediately before molding, compositions (I) and (II) are mixed by means of a mixing device such as a static mixer, a dynamic mixer such as a pin mixer or the like.

(I): a composition which comprises component (A), component (C), component (D), component (E), component (F), and, if necessary, fine powder of silica for reinforcement, and does not contain component (B) or a curing retarder, and (II): a composition which comprises component (B), and, if necessary, a curing retarder and does not contain component (C), component (D), or component (F).

The aforementioned sponge-forming silicone rubber composition is in the form of a water-in-oil emulsion, and water is present as a discontinuous phase. Therefore, the particle size of the aqueous phase substantially specifies the size of the cells of the silicone rubber sponge.

In the present invention, a molded silicone rubber sponge can be suitably produced using the aforementioned sponge-forming silicone rubber composition by means of, for example, cast molding. More specifically, for example, the aforementioned sponge-forming silicone rubber composition is filled into a cavity of a mold for cast molding, heated at a temperature of less than 100° C., preferably ranging from 50 to 90° C., and more preferably ranging from 70 to 80° C., under increased pressure or under normal pressure to cure (crosslink) the silicone rubber composition. Thereby, a molded hydrous silicone rubber in the form of a water-containing state is obtained. Subsequently, the molded rubber is cooled, if necessary, and then, mold opening is carried out. The obtained molded product is removed from the cavity, and water is removed from the molded silicone rubber in the form of a hydrous state by heating to, for example, 120 to 250° C. Thereby, a molded silicone rubber sponge having interconnected cells which are uniform and fine can be obtained. When the aforementioned sponge-forming silicone rubber composition is filled into a cavity of a mold for cast molding, by selecting appropriately the filling rate and the form of filling holes, separation or deposition of water or a thickener in the sponge-forming silicone rubber composition, caused by shearing during the filling can be prevented.

When the silicone rubber composition is heated in a cavity of a mold, an airtight condition in the cavity is preferably maintained. If the airtight condition in the cavity is not maintained, a non-foamed thin rubber layer may be formed on the surface of the molded silicone rubber sponge, and therefore, the cells in the sponge may fail to be communicated with the outer world. For this reason, function as a sponge may be impaired. In addition, uniformity of cells in a part of the molded product may be impaired. By maintaining the airtight condition of the cavity during heating the silicone rubber composition in the mold, the aforementioned failures can be prevented. On the other hand, when the silicone rubber composition is heated in the cavity of the mold, by making the arbitrary part in the cavity in an open state by forming gas-discharging fine holes or slits therein, a non-foamed thin rubber layer can also be formed on purpose on the arbitrary surface of the molded silicone rubber sponge.

The aforementioned sponge-forming silicone rubber compositions exhibit superior reproducibility of the cavity shape, and produce a sponge having fine and uniform interconnected cells. For this reason, the compositions are useful as an elastic material of fixing members of image-forming devices. In the case of a fixing roll, a silicone rubber sponge layer produced by curing (crosslinking) the aforementioned silicone rubber composition is formed on a metal core. In this case, the material, size and the like of the metal core can be appropriately selected in accordance with the roll type. In the case of a fixing belt, a silicone rubber sponge layer produced by curing (crosslinking) the aforementioned silicone rubber composition may be formed on an endless belt. In this case, the material, size and the like of the endless belt can be appropriately selected in accordance with the belt type.

In addition, at the outer periphery of the aforementioned silicone rubber sponge layer, a fluorine resin layer, a fluorine rubber layer, an elastic layer such as a non-foamed silicone rubber or urethane rubber or the like may be further provided, and thereby, a multiple layer structure may be formed. In this case, the fluorine resin layer can be formed by a fluorine resin coating material, a fluorine resin tube or the like, and thereby, the aforementioned silicone rubber layer is coated. As examples of the fluorine resin coating materials, mention may be made of, for example, latex of polytetrafluoroethylene resin (PTFE), Diel latex (manufactured by Daikin Industries Co., Ltd., a fluorine latex), and the like. In addition, as the fluorine resin tube, a commercially available product can be used. As examples thereof, mention may be made of, for example, a polytetrafluoroethylene resin (PTFE), a copolymer resin (PFA) of tetrafluoroethylene and perfluoroalkyl vinyl ether, a copolymer resin (FEP) of fluorinated ethylene and polypropylene, a polyfluorinated vinylidene resin (PVDF), a polyfluorinated vinyl resin and the like. Among these, in particular, PFA is preferred.

The thickness of the aforementioned silicone rubber sponge layer can be appropriately selected. In order to effectively utilize rubber elasticity of the silicone rubber sponge, the thickness preferably ranges from 0.05 to 80 mm, and in particular, preferably ranges from 0.1 to 50 mm. In addition, the thickness of the fluorine resin or fluorine rubber layer formed thereon preferably ranges from 5 to 200 μm, and in particular, preferably ranges from 10 to 100 μm.

In addition, in order to exhibit reduced thermal deformation (thermal expansion) and superior post-deformation recovery in the silicone rubber sponge, 90% or more of the cells preferably are interconnected cells. Whether or not the cells are interconnected cells can be examined by immersing the sponge to water, then allowing to stand under reduced pressure, and thereby, replacing the air of the interconnected cells by water. The rate of interconnected cells with respect to all the cells in the sponge, namely, the index of interconnected cells can be calculated by means of the following equation, assuming that the density of water is 1.0 g/cm$^3$:

$$\text{Index of interconnected cells}=100\times\{(\text{Weight of absorbed water})/(\text{Volume of cells})\}$$

wherein "volume of cells" can be calculated by means of the following equation:

$$\text{Volume of cells (cm}^3)=\{(\text{Weight of sponge})/(\text{Density of sponge})\}-\{(\text{Weight of sponge})/(\text{Density of rubber})\}$$

wherein "density of rubber" is the value obtained by measuring the density of a molded silicone rubber produced by crosslinking/curing the silicone rubber composition prepared in the same manner with the exception of containing none of component (C), component (D) and component (E), and represents a density of sponge cell walls.

The present invention is characterized in that, when a molded silicone rubber sponge is produced by filling the sponge-forming silicone rubber composition into a cavity of a mold, after curing the aforementioned composition and before mold opening, gas present in the cavity is discharged. Here, mold opening means the operation of opening the mold in order to remove a molded product from the cavity. Mold opening makes at least one part of the surface constituting the cavity open to the external world, and the molded product in the cavity is removed. Therefore, "mold opening" used herein includes, for example, the operation of opening the cavity in the aforementioned mold to the external world by removing a mold lid in the form of a cylinder, in addition to the operation of opening the cavity to the external world by separating plural mold members constituting the cavity.

In the present invention, before a molded silicone rubber sponge is removed from the cavity, gas present in the cavity is released to the outside to reduce or remove the inner pressure in the cavity. For this reason, when the molded silicone rubber sponge is removed from the cavity, projecting of apart of the aforementioned molded product from the cavity can be prevented or reduced. The silicone rubber sponge has reduced strength due to a "sponge". For this reason, the aforementioned projection may cause cracks to occur in the molded product in the cavity, the molded product may be cut, or the aforementioned projected part may be lost due to concentration of stress. In the present invention, the aforementioned projection is not present, or even if it is present, the projection is quite small in extent, and for this reason, breakage of the molded sponge does not occur.

The process for discharging gas present in the cavity is not particularly limited. For example, a mode in which discharging holes for discharging gas are provided on at least one part of the cavity and thereby, the gas is discharged, or a mode in which a mold with a cavity is constituted by plural members, and the gas present in the cavity is discharged from the interspaces of the plural members, can be applied. The mode of discharging gas from the cavity via discharging holes is preferred. In the case of discharging gas present in the cavity from the discharging holes, the number, shape, sectional area, arrangement and the like of the discharging holes can be appropriately selected in accordance with the molding method or the shape of the mold.

The aforementioned holes are preferably openable and closable. In the case of heating the silicone rubber composition in the cavity, the aforementioned holes are preferably closed. In addition, in order to prevent an occurrence of disadvantages when discharging gas from the cavity such that a cured product of the silicone rubber composition is projected to the outside of the cavity from the aforementioned holes and is deformed, and thereby the cured product is cut, a means for controlling deformation of a cured product is preferably provided in the aforementioned mold. The shape of the aforementioned means for controlling deformation is not particularly limited, and can be appropriately determined in accordance with the shape of the aforementioned holes. As examples of the aforementioned means for controlling deformation, mention may be made of, for example, a round plate or a ring-shaped stopper, in which many holes are provided to prevent obstructing the discharging of gas present in the cavity. The discharging of gas in the cavity may be carried out immediately after the heating and curing step. In the case in which a cooling step is present after the heating and curing step, the discharging of gas may be carried out during the cooling step or before or after the cooling step, but is preferably carried out before the cooling step.

Hereinafter, an embodiment of a mold for roller molding in which at least one part of the cavity has holes for discharging gas, and a process for producing a roller formed from a silicone rubber sponge using the aforementioned mold is disclosed.

FIG. 1 is a cross-sectional view showing an embodiment of a mold for use in roller molding useful in carrying out the present invention.

A mold 1 for use in roller molding shown in FIG. 1 is formed from an upper lid part 2 having a vent hole 2a at the center thereof, an inner mold 3 in the form of a cylinder having a cavity 3a, and a lower lid 4 having a filling channel 4a for a sponge-forming silicone rubber composition at the center thereof. Said upper lid part 2, inner mold 3 and lower lid part 4 are integrated by engaging spiral grooves at both ends of said inner mold 3 and spiral grooves formed on the inner periphery surface of said upper lid part 2 and the inner periphery surface of said lower lid part 4.

Figure 2:
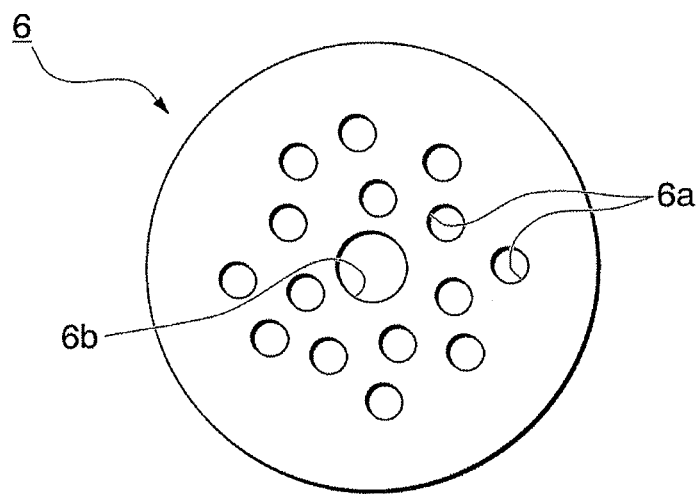
[FIG. 2] A front view of porous plate 6.
Figure 2:
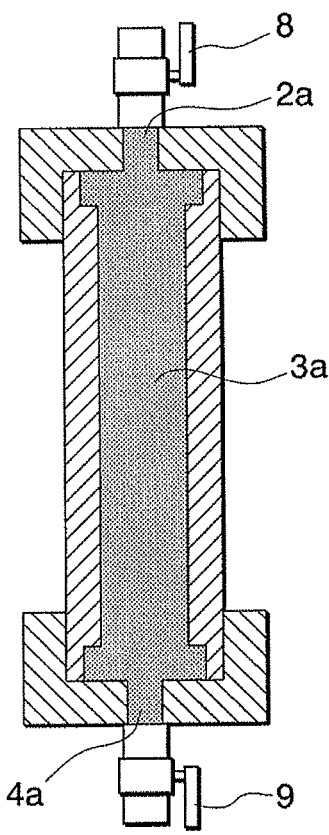
Figure 2:
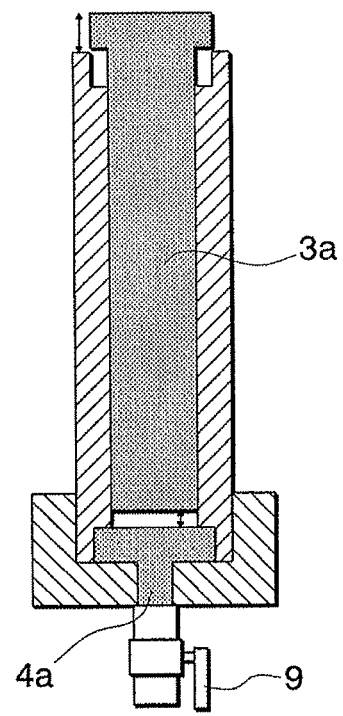

In said cavity 3a of said inner mold 3, a rod 5 constituting a shaft of a roller which corresponds to a molded product is arranged. In the mode shown in FIG. 1, two porous discs 6, each having many small holes 6a and one central hole 6b with a large diameter shown in FIG. 2, are prepared, both end parts of said rod 5 are partially inserted to said central holes 6b of said porous discs 6, 6. Thereby, said rod 5 together with porous discs 6, 6 is placed in said cavity 3a. The axis line of said rod 5 is conformed to the axis line of said cylindrical cavity 3a by adjusting the diameter of said porous disc 6 and the position of central hole 6b.

Porous discs 6, 6 are positioned at a position spaced from the upper bottom surface of said upper lid part 2 and at a position spaced from the lower bottom surface of said lower lid part 4 by means of spacers 7, 7 in the form of a ring. Said spacers 7, 7 are fixed to both end parts of said inner mold 3 by engaging the spiral grooves formed on the outer periphery surfaces of spacers 7, 7 with the spiral grooves formed on the inner surfaces of both end parts of said inner mold 3. Porous discs 6, 6 fixed by said spacers 7, 7 specify said cavity 3a to a space in the form of a roller, together with said rod 5 and the inner surface of said inner mold 3. Said space corresponds to a roller molding space.

On the other hand, a ball valve 8 is fixed in said vent hole 2a of said upper lid part 2. Vent hole 2a can be communicated with the outer world by rotating the valve. In the same manner as described above, a ball valve 9 is fixed in said filling channel 4a of said lower lid part 4. Said filling channel 4a can be communicated with a feeding line of a sponge-forming silicone rubber composition, which is not shown, by rotating the valve. As the valves, any types of valves can be used in accordance with the structure of the mold or molding conditions. In addition to the ball valves, needle valves, gate valves, groove valves and the like can be used.

When a roller formed from a silicone rubber sponge is molded by using the mold for roller molding shown in FIG. 1, first, said rod 5 is arranged in said cavity 3a of inner mold 3 in the state that both end parts of rod 5 which is a shaft of said roller are respectively inserted in the central holes 6b of two porous discs 6, 6. Next, spacers 7, 7 are fixed at the inner surface end parts of said inner mold 3, and thereby, said rod 5 and porous discs 6, 6 are fixed. Next, said upper lid part 2 with ball valve 8 and said lower lid part 4 with ball valve 9 are fixed to the end parts of said inner mold 3. Thereby, a mold for roller molding is prepared.

Next, said ball valve 8 and ball valve 9 are opened, and a sponge-forming silicone rubber composition is introduced from a feeding line, which is not shown, into said cavity 3a via said filling channel 4a. While said silicone rubber composition is introduced into said cavity 3a, the air present in cavity 3a is discharged to the outer world from small holes 6a of porous disc 6 present at said upper lid part 2 via vent hole 2a. Therefore, charging said cavity 3a with the sponge-forming silicone rubber composition can be smoothly carried out.

After said cavity 3a formed between said porous discs 6, 6 is completely charged with the sponge-forming silicone rubber composition, said ball valve 8 and ball valve 9 are closed. Said mold 1 for use in roller molding is heated by placing in, for example, a circulating hot air oven or hot water. Thereby, the sponge-forming silicone rubber composition is cured (crosslinked) in said cavity 3a, and is integrated with said rod 5. As a result, a silicone rubber sponge in the form of a roller is molded. During the aforementioned heating step, it is preferred that cavity 3a be tightly closed by closing said ball valve 8. By tightly closing cavity 3a during heating, formation of a thin non-foamed rubber layer on the surface of the silicone rubber sponge or impairment in uniformity of cells can be prevented.

After heating for a specified period, ball valve 8 is opened and vent hole 2a is communicated with the outer world. Thereby, the gas present in cavity 3a is released from small holes 6a of said porous disc 6 at said upper lid part 2, to the outer world via vent hole 2a. After opening for a specified period, said mold 1 for use in roller molding is cooled, if necessary, and said upper lid part 2 and lower lid part 4 are removed from said inner mold 3. In addition, said spacer 7 and porous discs 6, 6 are removed from said inner mold 3, and a roller formed from a silicone rubber sponge in cavity 3a is removed. Releasing gas may be carried out by opening said ball valve 9, or by removing said upper lid part and/or lower lid part 4 engaged with said inner mold 3. In the case in which a cooling step is present, the operation of releasing gas may be carried out during cooling or after completion of cooling. The produced roller formed from the silicone rubber sponge is in the hydrate state. For this reason, the roller is heated to dehydrate. As described above, a roller formed from the silicone rubber sponge having fine uniform interconnected cells can be obtained. The heating temperature at the time of dehydrating is not particularly limited. Natural drying at room temperature can be carried out, but in order to effectively form a sponge, the heating temperature is preferably 100° C. or more, and more preferably ranges from 120 to 250° C.

In the case of molding a roller formed from the silicone rubber sponge using said mold 1 for use in roller molding shown in FIG. 1, after the sponge-forming silicone rubber composition is cured in cavity 3a, gas is released from said porous discs 6 to reduce the pressure in the cavity 3a, followed by removing said roller. For this reason, at the time of removing the roller formed from the silicone rubber sponge from said mold 1 for use in roller molding, the sponge is never broken by extruding the end parts of said roller from the end parts of said cavity 3a.

In said mold 1 for use in roller molding shown in FIG. 1, said porous discs 6 also possess a function as a means for controlling deformation, and control the extrusion of the roller formed from the silicone rubber sponge from the end part of said cavity 3a during releasing gas.

In addition, in the process for producing the roller formed from the silicone rubber sponge using said mold 1 for use in roller molding shown in FIG. 1, immediately after said mold 1 for use in roller molding is cooled, if necessary, the roller formed from the silicone rubber sponge can be removed from said cavity 3a. Therefore, by means of using said mold 1 for use in roller molding, a molded silicone rubber sponge can be effectively produced.

INDUSTRIAL APPLICABILITY

The molded silicone rubber sponges obtained in accordance with the preparation process of the present invention have interconnected cells which are uniform and fine. For this reason, they can be suitably used in elastic parts such as fixing rollers, fixing belts, and the like for fixing toner to recording media such as paper and the like by heating and/or pressurizing in image-forming devices such as electrophotographic copying machines, printers, facsimile machines and the like, in addition to products in fields in which sponge members are commonly used, such as insulators, acoustic absorbents, cushions, packings, gaskets, pads, and the like.

In addition, the present invention can effectively produce molded silicone rubber sponges having the aforementioned usages in the state of no breakages such as cracks, cuts, chips and the like.

EXAMPLES

Hereafter, the present invention is described in detail with reference to examples and comparative examples. It should be understood that the present invention is not limited to the examples. The values of viscosity described in the examples are measured at 25° C.

The state of cells, average cell size, and index of interconnected cells were measured in accordance with the methods described below.

<State of Cells>

Cross-section of a specimen for measuring permanent compression set was visually observed. The molded sponge in which the state of cells was uniform across the entire cross-section was evaluated as uniformity, and the molded sponge in which enlarged cells were partially observed was evaluated as non-uniformity.

<Average Cell Size>

A specimen for measuring hardness was cut across by means of a razor blade, the central part of the cut surface was observed under a scanning electron microscope. The diameter of about 200 to 300 cells on an area of 0.04 mm² was measured, and then, the average (number average) thereof was calculated. Thereby, the average cell size was measured. In addition, the cell size of the maximum cell observed during the measurement of the average cell diameter was used as the maximum cell diameter.

<Index of Interconnected Cells>

Weight and density of the silicone rubber sponge specimen for testing permanent compression set were measured, and the volume of cells was determined by inserting them into the equation described below.

Volume of cells={(Weight of sponge)/(Density of sponge)}−{(Weight of sponge)/(Density of rubber)}

In the equation, the density of rubber corresponded to the density of a test specimen for measuring permanent compression set obtained by crosslinking and curing a silicone rubber composition prepared by the same process as described above, with the exception of containing none of component (C) and component (D).

In addition, the sponge specimen was retained in water and allowed to stand for 3 minutes under a reduced pressure of −750 mmHg to absorb water. The weight of the absorbed water was measured, and then, the index of interconnected cells was obtained in accordance with the following equation:

Index of interconnected cells (%)={(Weight of absorbed water)/(Volume of cells)}×100 by inserting the measured value and using a density of water of 1.0 g/cm³.

Preparation Example 1

100 parts by weight of a polydimethylsioxane capped at both molecular terminals with dimethylvinylsiloxane groups having a viscosity of 40,000 mPa·s, 40 parts by weight of fumed silica having a BET specific surface area of 225 m²/g, 7 parts by weight of hexamethyldisilazane, 2 parts by weight of water, and 0.2 parts by weight of a copolymer of dimethylsiloxane and methylvinylsiloxane, capped at both molecular terminals with dimethylhydroxysiloxy groups, and having a viscosity of 20 mPa·s (vinyl group content=about 10.9% by weight) were placed in a Ross mixer, and mixed at room temperature until a uniform mixture was obtained. Subsequently, the mixture was subjected to heat treatment for 2 hours at 200° C. under reduced pressure. Thereby, a flowable silica master batch was prepared.

Preparation Example 2

The raw materials described below were placed in a homomixer (manufactured by Tokushu Kika Co., Ltd.) and mixed at 25° C. until a uniform mixture was obtained.
(1) Silica master batch prepared in Preparation Example 1: 11 parts by weight
(2) Copolymer of dimethylsiloxane and methylvinylsiloxane, capped at both molecular terminals with dimethylvinylsiloxy groups, and having a viscosity of 7,500 mPa·s (vinyl group content=about 0.31% by weight): 89 parts by weight
(3) Mixture of an inorganic thickener and water obtained by placing 1 part by weight of smectite clay (organic polymer-hybrid hydrophilic purified bentonite (pH 6.5)) and 99 parts by weight of ion-exchanged water in a homomixer, and mixing them at room temperature until a uniform mixture was obtained: 100 parts by weight
(4) Nonionic surfactant (sorbitan fatty acid ester, manufactured by Sanyo Kasei Industries, Co., Ltd., HLB 4.3): 0.7 parts by weight Subsequently, the following raw materials were blended in the obtained mixture, and deaerated. Thereby, a sponge-forming liquid silicone rubber composition was prepared.
(5) 1,3-divinyltetramethyldisiloxane solution of a platinum complex of 1,3-divinyltetramethyldisiloxane (platinum metal content=about 4,000 ppm): 0.25 parts by weight
(6) Ethynyl cyclohexanol: 0.05 parts by weight
(7) Copolymer of dimethylsiloxane and methylhydrogensiloxane, capped at both molecular terminals with trimethylsiloxy groups, and having a kinetic viscosity of 5.0 mm²/s (silicon atom-binding hydrogen atom content=about 0.73% by weight): 6.00 parts by weight The sponge-forming liquid silicone rubber composition prepared in Preparation Example 2 was crosslinked and cured under the conditions of 90° C./10 minutes using a compression molding machine. Thereby, various types of specimens in the form of a hydrate were prepared. Subsequently, the aforementioned specimens were allowed to stand in an open system for 4 hours at 200° C. to remove water in the specimens. Thereby, silicone rubber sponge specimens were obtained. The aforementioned silicone rubber sponge specimens had a density of 0.57, a hardness of 25, a tensile strength of 0.40 MPa, an elongation of 100%, a permanent compression set of 26%, an index of interconnected cells of 100%, a rebound resilience of 65%, and a coefficient of thermal conductivity of 0.11 W/(m·K). The density, hardness, tensile strength, elongation, permanent compression set, rebound resilience, and coefficient of thermal conductivity were measured by the following measuring methods:

<Density>

Density was measured in accordance with the provisions of JIS K6268.

<Hardness (Asker C)>

Hardness was measured in accordance with a test method specified in JIS K7312 by means of a type C hardness tester. Two specimens, each having a thickness of 6 mm, were stacked and then used.

<Tensile Strength and Elongation>

Tensile strength and elongation were measured in accordance with the provisions of JIS K6251.

<Permanent Compression Set>

Permanent compression set was measured in accordance with the provisions of JIS K 6262, under the conditions of 180° C. and 25% compression for 22 hours.

<Rebound Resilience>

Rebound resilience was measured in accordance with the provisions of JIS K6255 using a Lupke resilience tester specified in JIS K6255.

<Coefficient of Thermal Conductivity>

Coefficient of thermal conductivity of a specimen was measured by means of "Quick Thermal Conductivity Meter QTM-500", manufactured by Kyoto Electronics Manufacturing Co., Ltd. Two specimens, each having a thickness of 6 mm, were stacked and then used.

Example 1

A molded sponge in the form of a cylinder was produced using a mold of which the general cross-section is shown in FIG. 3. The mold shown in FIG. 3 has the same construction as that of the mold shown in FIG. 1, with the exception of rod 5, porous disc 6, and spacer 7, and therefore, in FIG. 3, the same members as shown in FIG. 1 have the same symbols as those thereof. The inner mold of the mold shown in FIG. 3 was formed from a transparent acrylic resin.

First, ball valve 9 was opened, the sponge-forming liquid silicone rubber composition prepared in Preparation Example 2 was filled into cavity 3a (length=240 mm, diameter of cross-section=35 mm) from filling channel 4a. At the time of filling, ball valve 8 was opened to discharge air present in said cavity 3a from said vent hole 2a. After the sponge-forming liquid silicone rubber composition was spilled out from said ball valve 8, said ball valve 8 was closed, and subsequently, said ball valve 9 was closed. FIG. 3(a) shows the state in that said silicone rubber composition was filled in said cavity 3a.

Subsequently, the mold charged with the sponge-forming liquid silicone rubber composition was placed in a circulating hot air oven at 80° C. for 90 minutes. Said ball valve 8 (open diameter=about 5 mm) was opened immediately after the mold was ejected from the oven, and the gas present in the mold was discharged. When the upper lid part was removed after the mold was cooled for one hour at 20° C. in water, a molded product was extruded with a height of 20 mm from the upper end of the mold. On the surface of the obtained molded sponge, any thin non-foamed rubber layer was not observed, and no chips or breakages in the molded product were observed. The cell condition of the molded sponge was uniform and average cell size was 7 μm, and the index of the interconnected cells was 100%.

Example 2

In the same manner as described in Example 1, the sponge-forming liquid silicone rubber composition prepared in Preparation Example 2 was filled in cavity 3a (length=240 mm, diameter of cross-section=35 mm), and the mold was placed in a circulating hot air oven at 80° C. for 90 minutes. Said ball valve 8 (open diameter=about 15 mm) was opened after the mold was ejected from the oven and then cooled for one hour at 20° C. in water, and the gas present in the mold was discharged. Subsequently, when the upper lid part was removed, a molded product was extruded with a height of 10 mm from the upper end of the mold. On the surface of the obtained molded sponge, any thin non-foamed rubber layer was not observed, and no chips or breakages in the molded product were observed. The cell condition of the molded sponge was uniform and average cell size was 7 μm, and the index of the interconnected cells was 100%.

Example 3

First, ball valve 9 was opened, the sponge-forming liquid silicone rubber composition prepared in Preparation Example 2 was filled into cavity 3a (length=240 mm, diameter of cross-section=35 mm) from filling channel 4a. At the time of filling, ball valve 8 was opened to discharge the air present in said cavity 3a from said vent hole 2a. After the sponge-forming liquid silicone rubber composition was spilled out from said ball valve 8, said ball valve 8 was closed with a gap of about 1 mm, and subsequently, said ball valve 9 was closed.

Subsequently, the mold in which said cavity 3a is filled with the sponge-forming liquid silicone rubber composition was placed in a circulating hot air oven at 80° C. for 90 minutes. Said ball valve 8 (open diameter=about 15 mm) was opened immediately after the mold was ejected from the oven and the mold was cooled for one hour in water at 20° C., and then, the gas present in the mold was discharged. When the upper lid part was removed, the molded product was extruded with a height of 10 mm from the upper end of the mold. On the upper end part surface of the obtained molded sponge, a thin non-foamed rubber layer was observed. In addition, large cells were observed around the upper end part and the cells at the upper end part were not uniform. In the molded product other than the upper end part, no chips or breakages were observed, and the cell condition of the molded sponge was uniform. The average cell size was 7 μm, and the index of the interconnected cells was 100%.

Comparative Example 1

In the same manner as described in Example 1, the mold in which said cavity 3a is filled with the sponge-forming liquid silicone rubber composition prepared in Preparation Example 2 was placed in a circulating hot air oven at 80° C. for 90 minutes. The mold was ejected from the oven and then cooled for 5 hours in water at 20° C. When the upper lid part was removed, the molded product was extruded with a height of 35 mm from the upper end of the mold. On the surface of the obtained molded sponge, any thin non-foamed rubber layer was not observed. However, the molded sponge was cut as shown in FIG. 3(b), and a gap of about 10 mm was observed in said cavity 3a.

Description of Symbols

1: Mold for use in roller molding, 2: Upper lid part, 3: Inner mold, 4: Lower lid part, 5: Rod, 6: Porous disc, 7: Spacer, 8: Ball valve, 9: Ball valve

The invention claimed is:

1. A process for producing a molded silicone rubber sponge by filling a sponge-forming silicone rubber composition into a cavity of a mold, wherein after said sponge-forming silicone rubber composition is cured, and before mold opening of said mold, gas present in said cavity is discharged.

2. The process for producing a molded silicone rubber sponge according to claim 1, wherein said production of said molded silicone rubber sponge is carried out by cast molding.

3. The process for producing a molded silicone rubber sponge according to claim 1, wherein the curing of said sponge-forming silicone rubber composition is carried out by heating.

4. The process for producing a molded silicone rubber sponge according to claim 3, wherein during said heating, an airtight condition is maintained in said cavity.

5. The process for producing a molded silicone rubber sponge according to claim 3, wherein after said gas is discharged, and before said mold opening, a cooling step of cooling a cured product of said sponge-forming silicone rubber composition is included.

6. The process for producing a molded silicone rubber sponge according to claim 1, wherein after said mold opening, a dehydrating step of removing water from said molded silicone rubber sponge is included.

7. The process for producing a molded silicone rubber sponge according to claim 1, wherein at least one part of said cavity has at least one hole for discharging gas.

8. The process for producing a molded silicone rubber sponge according to claim 7, wherein said hole is openable and closable.

9. The process for producing a molded silicone rubber sponge according to claim 1, wherein a means for controlling deformation of a cured product of said sponge-forming silicone rubber composition during discharging said gas is provided in said mold, wherein said means for controlling deformation comprises a round plate or ring-shaped stopper with many holes.

10. The process for producing a molded silicone rubber sponge according to claim 1, wherein said sponge-forming silicone rubber composition comprises:

(A) a polyorganosiloxane having at least two silicon-bonded alkenyl groups in a molecule;
(B) a polyorganosiloxane having at least two silicon-bonded hydrogen atoms in a molecule;
(C) water;
(D) a thickener;
(E) an emulsifier; and
(F) a hydrosilylation reaction catalyst.

11. The process for producing a molded silicone rubber sponge according to claim 10, wherein said sponge-forming silicone rubber composition comprises a curing retarder.

12. The process for producing a molded silicone rubber sponge according to claim 1, wherein said molded silicone rubber sponge is a roller, a belt, or a constitutional member thereof.

13. The process for producing a molded silicone rubber sponge according to claim 4, wherein after said gas is discharged, and before said mold opening, a cooling step of cooling a cured product of said sponge-forming silicone rubber composition is included.

14. The process for producing a molded silicone rubber sponge according to claim 3, wherein after said mold opening, a dehydrating step of removing water from said molded silicone rubber sponge is included.

15. The process for producing a molded silicone rubber sponge according to claim 5, wherein after said mold opening, a dehydrating step of removing water from said molded silicone rubber sponge is included.

* * * * *